United States Patent Office 3,490,895
Patented Jan. 20, 1970

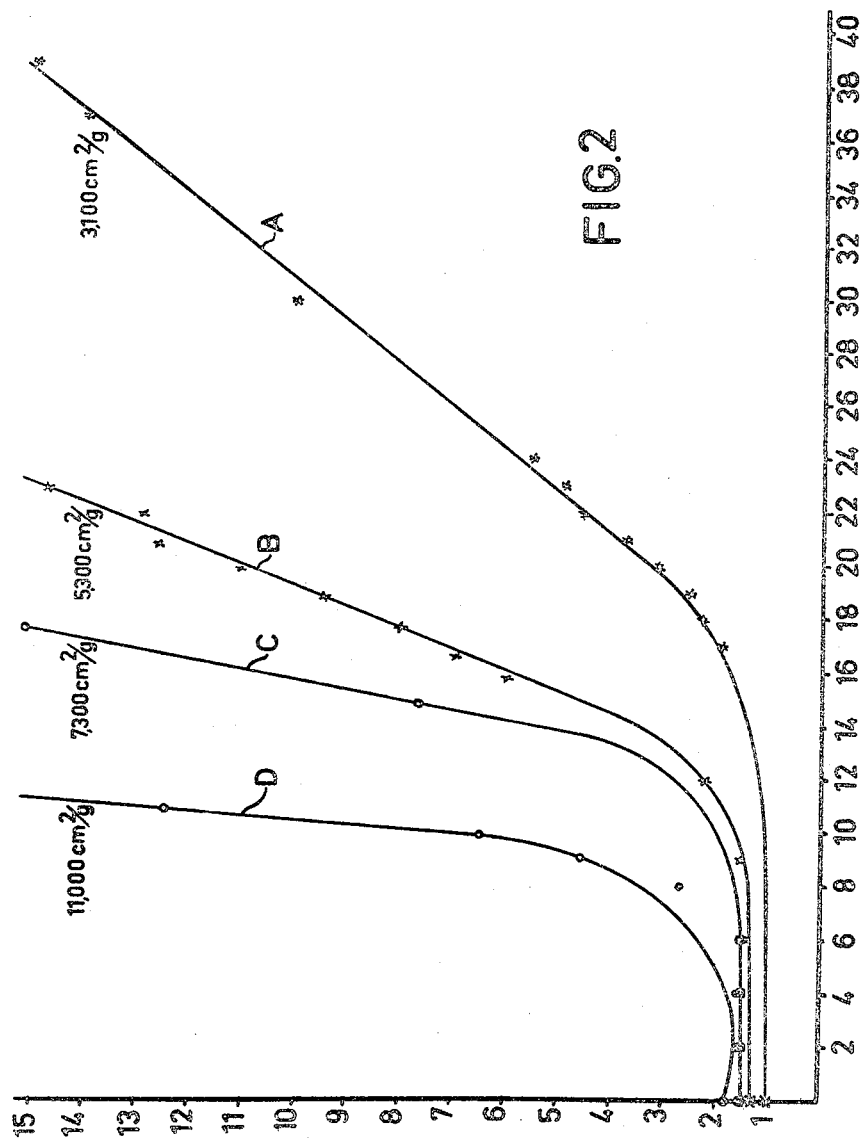

3,490,895
PROCESS FOR COLD-HARDENING OF SHAPED BODIES
Karl Jonas V. Svensson, Strassa, Sweden, assignor to Trafikaktiebolaget Grangesberg-Oxelosund, Stockholm, Sweden, a Swedish joint-stock company
Filed Oct. 27, 1967, Ser. No. 678,648
Claims priority, application Sweden, Nov. 4, 1966, 15,132/66
Int. Cl. C21b 1/18; C22b 1/06; C05b 19/00
U.S. Cl. 75—3
14 Claims

ABSTRACT OF THE DISCLOSURE

A process for the cold-hardening of pellets containing iron ore concentrates, finely divided Portland cement clinkers and water. The green pellets are embedded in a mass of discrete finely divided iron ore particles, which protects the pellets from being deformed and prevents them from agglomerating. The embedding mass is separated from the pellets when they have achieved an acceptable strength.

---

Figure 1:
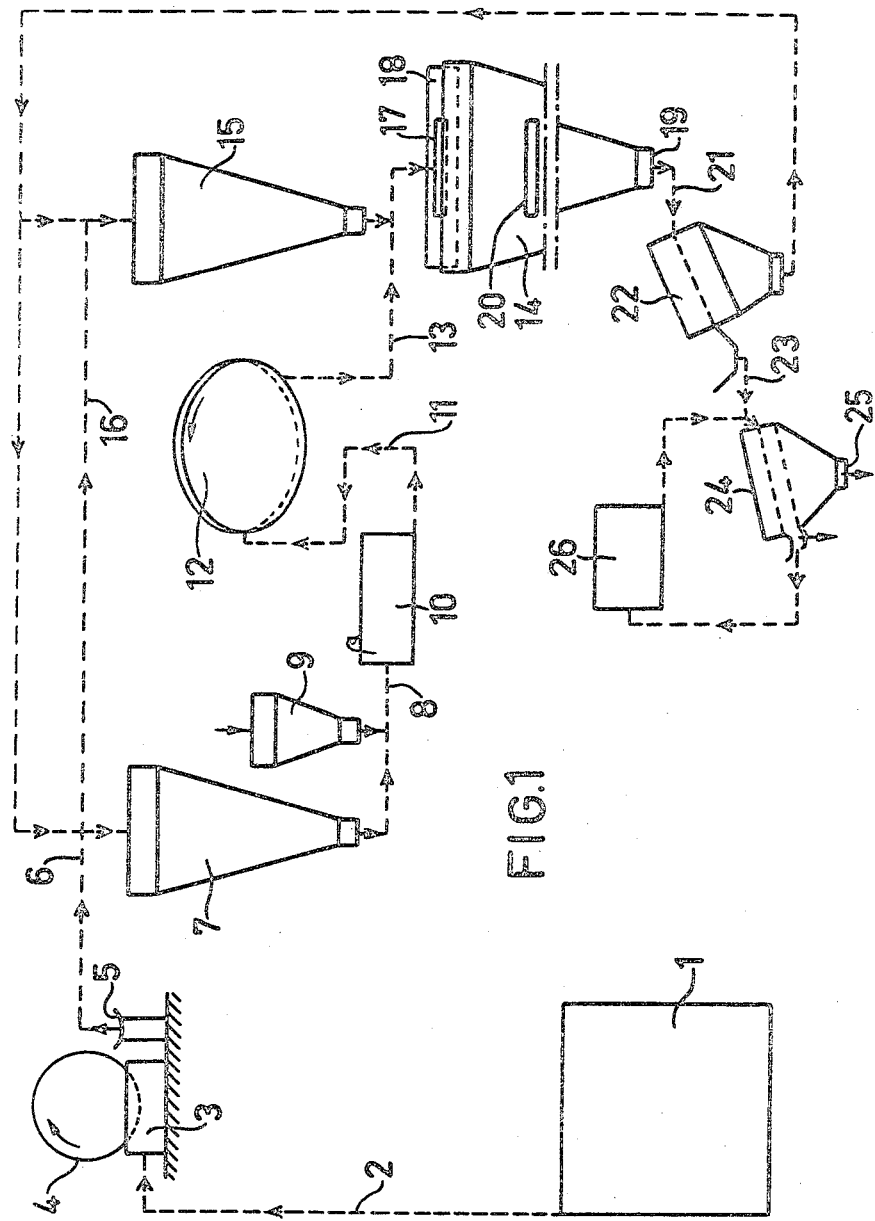

This invention relates to a process for cold-hardening of shaped bodies containing finely divided metal oxides and binding agents.

In this connection the term "shaped bodies" refers to pellets, balls, briquettes, tablets and similar shapes.

It has been previously known how to produce briquettes of finely divided oxidic iron ore particles with Portland cement as a binding agent. The difficulties implied in this process were that it took a long time before the briquettes acquired sufficient workability strength. It has also been known how to produce pellets of such finely divided metal oxide, Portland cement and a carbonaceous reducing agent. The latter process does not seem to have been any success, probably owing to the circumstance that, in the course of the cold-hardening process the green unhardened pellets so produced agglomerated into large masses which could not suitably be charged into the reduction furnace.

An additional disadvantage was that the cement-bound briquettes and pellets contained sulphur in the form of gypsum derived from the Portland cement. As a matter of fact, when grinding cement clinkers gypsum is added as an agent for controlling the setting time. This is a disadvantage, since part of the sulphur contained in the gypsum enters into the metal already reduced which, owing to this circumstance, probably must be subjected to special sulphur purification.

Portland cement has a relatively long setting time. If this could be reduced it would mean a decided advantage, since, as a result, the time during which the pellets are mechanically weak would be shorter. It is of course also an advantage that one would in this way find the means to increase the production speed.

The main object of the present invention is to arrive at a process for cold-hardening of shaped bodies which would prevent the shaped bodies from agglomerating in the course of the cold-hardening.

An additional object of the present invention is to obtain shaped bodies which are cold-hardened more rapidly than hitherto known cement-bound shaped bodies, which means that the critical time for aggregration, demolition and cracking of the green shaped bodies is reduced.

A further object is to form shaped bodies containing metal oxide concentrates and binding agents which do not contribute to the introduction of sulphur into the metal already reduced.

The main object of the present invention is achieved in such a way that the finely divided metal oxide concentrate is intimately mixed with a finely divided hydraulic binding agent; that "green" shaped bodies are produced from the obtained mixture; the shaped bodies are then embedded in a mass in such a way that, in principle, they are isolated from each other, and that the mass is separated from the bodies when, thanks to the setting effect of the hydraulic binding agent, the shaped bodies have reached an acceptable strength. The contents of the comprising components should be 75–95, preferably 85–93 percent, by weight, metal oxide concentrate and 5–25, preferably 7–15 percent, by weight hydraulic binding agent as per dry substance. When producing the green (unhardened) shaped bodies the mixture should, in addition, contain 7–10 percent water.

The mass in which the green shaped bodies are embedded then forms a desirable component in the subsequent reduction and, preferably, a component which is already present in the shaped bodies. It is considered most suitable that the mass should consist of the metal oxide included in the shaped bodies. However, other possible masses may consist of lime, quartz or carbon, all in a finely divided form.

It has been found appropriate to embed the shaped bodies in the mass by mainly simultaneously charging them and the mass in suitable proportions into a silo or other storage vessel. According to the preferred embodiment of the present invention the shaped bodies are charged by means of a conveyor belt, the shaped bodies being covered by the mass in the course of their transfer to the silo or the storage. The embedding mass should constitute at least 40 percent, by volume, of the charge in the silo or the storage in order to ensure the effective isolation of each shaped body so that the shaped bodies do not as far as possible come into contact with each other and so that the shaped bodies—thanks to the embedding mass—are subjected to an overall pressure which does not deform them.

In order to arrive at a more rapid cold-hardening than has hitherto been possible, the hydraulic binding agent may, according to the present invention, either consist of a rapid-binding cement or of cement clinkers which have been finely ground prior to their being mixed with the metal oxide. The fine grinding should be carried on to the extent that the ground product has a specific surface not less than 5000 cm.$^2$/g., preferably not less than 6000 cm.$^2$/g. The setting time decreases with the increasing specific surface. However, from an economic point of view, the grinding should not be carried on too far. It is considered that about 8000 cm.$^2$/g. is a suitable, although not the critical, upper limit for the fine grinding.

The specific surface has in this case consistently been measured according to the Svenson Method (Swedish Iron Masters' Association's Annals, vol. 133, part 2, 1949, pages 33–86).

An additional factor contributing to a rapid setting is the temperature of the charge during the process of cold-hardening. It has proved advantageous to carry out the cold-hardening at a temperature above room temperature and preferably at 20–60° C. This can be achieved by heating some of the components of the shaped bodies, for instance the finely ground metal oxide, the shaped bodies themselves, and/or the mass. However, it should be so controlled that the temperature during the process of production of the shaped bodies does not exceed 30–35° C. Owing to the heat generated in the course of the setting of the binding agent the temperature will later rise to some extent (about 10–15° C.).

It is also possible to increase the rate of setting by adding an agent which increases the rate of setting to the hydraulic binding agent. Such an agent which has been known for a long time is calcium chloride. Unfortunately, it has, as a rule, appeared that cold-bound pellets containing calcium chloride in the course of the subsequent reduction are subject to a swelling which increases with an increased addition of $CaCl_2$. Such a swelling may make the pellets crack and cause serious disturbances in the reduction furnace. Up to 2 percent $CaCl_2$ of the weight of the binding agent, however, does not normally cause any serious disturbances in the course of the reduction and it considerably increases the rate of setting.

In order to prevent the shaped bodies from contributing to the introduction of sulphur into the completely reduced metal the hydraulic binding agent should be as free from sulphur compounds as possible. The preferred binding agent therefore consists of finely ground cement clinkers which have been ground without the conventional addition of gypsum.

However, it lies within the scope of the present invention to utilize cement containing gypsum. It is true that the sulphur content of the reduced metal can easily become somewhat too high if cement with a normal content of gypsum (2–4 percent) is used in the shaped bodies, if the charge to the blast furnace solely consists of such shaped bodies, but normally other material which does not contain sulphur or has a very low sulphur content is also simultaneously used as a charging material. The completely reduced metal will thus contain an acceptably low sulphur content. If the sulphur content of the metal should become too high there are nowadays methods for removing most of the sulphur content of the metal after the blast furnace.

According to the preferred embodiment of the present invention the shaped bodies consist of pellets which contain finely divided iron oxide—so-called iron concentrates with a moisture content which is normally obtained by a process of vacuum filtering, i.e. 7–10 percent water—and finely divided cement clinkers without deliberately added sulphur compounds. Conventionally, the green balls are produced by being rolled in a revolving drum or on an inclined revolving plate. The finished rolled balls are transferred on a conveyor belt passing a silo from which finely divided iron oxide is discharged onto the passing balls; the balls and the finely divided iron oxide together are charged into a silo or a storage. The time spent in the silo or the storage is sufficient for the balls to achieve an acceptable rigidity and strength for a continued treatment.

In this connection the term "hydraulic binding agent" refers to inorganic substances which in combination with water form a mechanically strong material achieving its strength after being stored for a longer or shorter period of time.

The term "cement" refers in the first place to portland cement defined as a product which is made by intimately mixing limy and clayey products or other raw materials containing $SiO_2$, $Al_2O_3$ and $CaO$ in suitable proportions, by burning this mixture to sintering, and by the subsequent fine grinding of the resulting so-called cement clinkers.

From the above it is made evident that "cement clinkers" are intermediate products in the manufacturing process of portland cement. When manufacturing cement the cement clinkers are usually mixed with a few percent (2–4 percent) of gypsum in the course of grinding.

A variant of portland cement is "Rapid Hardening portland cement" or "High Early Strength portland cement" characterized in that it quickly reaches high early strengths. This is usually achieved by using a somewhat higher content of tricalcium silicate and a somewhat lower content of dicalcium silicate than is contained in corresponding "normal" portland cement and by grinding the clinkers more finely.

Other variants of portland cement which can be used according to the present invention are pozzolan cement, slag cement and aluminate cement.

Pozzolan cement consists of a mixture of portland cement and so-called pozzolans. The latter are substances which react with lime in the presence of water to form cementitious compounds. Normally the content of pozzolans is 15–50 percent, by weight. As an example of a Swedish pozzolan cement "Armour cement" may be mentioned.

Slag cement is based on the capability possessed by certain blast-furnace slags in the presence of lime or lime-depositing substances in water to form mechanically strong products of a cementitious nature. The most important blast-furnace slags are:

(1) Lime slag cement produced of blast-furnace slag and lime;

(2) Eisenportlandscement ("iron portland cement") consisting essentially of about 70 percent portland cement and about 30 percent blast-furnace slag; and (3) Hochofencement ("blast-furnace cement") of about 70 percent blast-furnace slag and 30 percent portland cement.

Aluminate cement (sometimes called "fusion cement") is more distinct from normal portland cement. It is produced by burning a mixture of limestone and bauxite to melting and the subsequent fine grinding of the obtained smelt.

The term "cement" embraces also non-portland cements of which lime and hydraulic lime may be mentioned.

Lime is obtained by burning limestone according to the formula $$CaCO_3 + heat = CaO + CO_2$$

The required temperature for pure calcium carbonate at atmospheric pressure is 897° C. In practice a temperature of about 1000° C. is applied.

Certain low-rate limestones contain considerable amounts of $Al_2O_3$, $SiO_2$ and $Fe_2O_3$ as impurities. After burning such limes are capable of hardening with water without the effect of aerial carbonic acid. They are usually called hydraulic limes.

Examples of the embodiment of the present invention in a suitable installation and the test results obtained will be presented in the following, reference being made to the accompanying drawings, where FIG. 1 is a schematical view of an installation for the production of pellets, and FIG. 2 is a diagram showing the compressive strength of the pellets as a function of the setting time at different finenesses of the constituent cement clinkers.

FIG. 1 is a schematical view of the production of cold-hardened pellets of iron ore concentrates and cement clinkers.

Iron ore concentrates with a specific surface of 3100 cm.$^2$/g. and with the following composition:

|  | Percent |
|---|---|
| FeO | 30.7 |
| $Fe_2O_3$ | 68.5 |
| $SiO_2$ | .13 |
| $P_2O_5$ | .023 |
| MnO | .17 |
| CaO | .03 |
| MgO | .11 |
| $Al_2O_3$ | .09 |
| $TiO_2$ | .05 |
| $V_2O_5$ | .24 |
| S | .001 |
| $Na_2O$ | .01 |
| $K_2O$ | .01 |
| Ignition loss | .13 |
| Total | 100.19 |
| Fe total | 71.8 |
| Mn | .13 |
| P | .010 |
| V | .165 | were mixed with water in container 1 to pumpable pulp. As indicated by dashed line 2, the pulp was pumped to vessel 3, in which filtering drum 4 was immersed. The inside of the drum was coupled to a vacuum pump, not shown. The filter cake was transferred to conveyor belt 5 and passed, as indicated by dashed line 6, to silo 7 and also to silo 15.

The filter cake contained 8 percent water. The filtering may with advantage be carried out during heating, e.g. during steam feeding.

The iron ore concentrates were discharged from silo 7 to a conveyor belt, as indicated by dashed line 8, which belt passed below silo 9 from which finely ground cement clinkers were discharged on the concentrates' string. The ratio between the weight of the concentrates discharged and that of the cement clinkers discharged was 9:1.

The cement clinkers were ground to a specific surface of 7300 cm.$^2$/g. with the following composition:

| | Percent |
|---|---|
| $Fe_2O_3$ | 2.6 |
| $SiO_2$ | 21.0 |
| $P_2O_5$ | .016 |
| MnO | .04 |
| CaO | 69.0 |
| MgO | 1.55 |
| $Al_2O_3$ | 4.10 |
| $TiO_2$ | .22 |
| S | .003 |
| $Na_2O$ | .02 |
| $K_2O$ | .02 |
| Ignition loss | 1.20 |
| Total | 99.77 |

The iron ore concentrates and the cement clinkers were then introduced into revolving mixing drum 10 and after careful mixing transferred by a conveyor belt to balling disc 12, as indicated by dashed line 11. The finished rolled balls were transferred by a conveyor belt to silo 14 as indicated by dashed line 13.

The ball disc 12 was provided with a spraying device (not shown) for an additional wetting of the balls, if required.

Part of the filter cake consisting of iron ore concentrates was transferred from conveyor belt 5 to silo 15 as indicated by dashed line 16. When conveyor belt 13 passed below silo 15 concentrates were discharged upon the string of balls which were completely covered. The balls and concentrates were poured into charging carriage 17 which was arranged so that it moved backwards and forwards on revolving bridge 18. During the backwards and forwards movement the balls and concentrates were discharged from carriage 17 into silo 14 in such a way to give the filling of the silo a smooth upper surface in order to eliminate a varying compressive pressure on the balls contained in the silo.

In silo 14 the balls embedded in the concentrates were cold-hardened whereby they in principle were isolated from each other, i.e. were not on the whole in contact with each other and were exposed to an overall pressure so that they should not be deformed. The size of silo 14 and the discharge speed of the pellets and concentrates at 19 were adapted in such a way that the discharged pellets were strong enough so as not to crack during the ensuing treatment. The pellets produced according to this example had achieved a compressive strength of not less than 15 kg. after 18 hours. In order further to increase the compressive strength and thus obtain a satisfactory safety margin the operational time (cold-hardening time) was increased to 72 hours.

Since it was important that all the balls in silo 14 should be subjected to on, the whole, the same cold-hardening time plate 20 in the shape of a shield was arranged in the centre of the silo. In this manner it became possible for the balls which had landed in the periphery of the silo to have more or less the same passing time as those that had landed in the centre of the silo.

As indicated by dashed line 21 the cold-hardened pellets and the embedding mass were transferred to sieve 22 where the embedding mass was separated from the pellets by the sieve and returned to silos 7 and 15. The pellets freed from the embedding mass were passed to double-decked wash sieve 24 as indicated by dashed line 23, where the finished pellets passed the upper sieve deck and were subjected to washing on the lower sieve deck, where the remainder of the embedding mass was washed off. After washing the produced pellets are transferred to the storage. Agglomerated pellets which do not pass the upper sieve deck are transferred to separation drum 26, where the agglomerations are divided into separate pellets and then returned to sieve 24. The material passing the wash sieve is suitably returned to silos 7 and 15 after thickening and filtering.

It is of course desirable that the pellets should achieve a satisfactory compressive strength as soon as possible, since there is the risk of crumbling even in silo 14 particularly in the lower parts of the silo where the pressure from the overhead charge is high.

The risk of crumbling or cracking is reduced if the cement clinkers are ground to an extreme fineness. FIG. 2 illustrates in diagrammatic form tests with cement clinkers of varying fineness. During all the tests the iron ore concentrates accounted for in the above example were used, i.e. those with a specific surface of 3100 cm.$^2$/g. If the cement clinkers were ground to a specific surface of 3100 cm.$^2$/g. (curve A) a compressive strength of 15 kg. was reached after 39 hours, which meant that during a relatively long period the pellets had had a low strength and a strong tendency to agglomerate with a simultaneous increase of the pressure which resulted in a lower yield of finished, faultless pellets.

In silo 14 the pellets are also subjected to wear through rubbing against the surrounding charge. At a low strength there is a considerable amount of wear and the wear rate decreases as the strength increases.

The wear test which is better known as the "tumbler test" is carried out in such a way that 25 pounds of pellets are placed in a precisely defined drum which is made to revolve at a fixed speed and a fixed number of revolutions. The test is standardized according to ASTM, part 8, pages 1366–67. After the treatment in the drum the content of the drum is sieved on a sieve with a mesh width of 6 mm. The wear value obtained refers to the percent, by weight, which does not pass through the sieve.

During the test with cement clinkers with a specific surface of 3100 cm.$^2$/g. a wear value of 95.0 percent was obtained after 72 hours' cold-hardening, which was considered a satisfactory result.

Curve B in FIG. 2 refers to a grinding to 5300 cm.$^2$/g. In this case a compressive strength of 15 kg. was reached after 23 hours' cold-hardening. After 72 hours' cold-hardening the wear value was 95.7 percent. The yield of faultless pellets increased considerably as compared with the preceding test.

Curve C refers to tests with cement clinkers with a specific surface of 7300 cm.$^2$/g. A compressive strength of 15 kg. was already reached after 18 hours and after 72 hours the wear value was 96.2 percent.

Curve D refers to tests with cement clinkers with a specific surface of 11,000 cm.$^2$/g. After about 12 hours the pellets had obtained a compressive strength of 15 kg. The wear value was 96.2 percent after 72 hours' cold-hardening.

When assessing the results, taking into account the production cost and particularly the grinding cost in relation to the yield of faultless pellets, it appeared that the cement clinkers could with advantage be ground to a specific surface of 5000–8000 cm.$^2$/g., preferably 6000–8000 cm.$^2$/g.

The time required for achieving sufficient strength could be further reduced by small additions of calcium chloride, burnt lime, burnt dolomite, bentonite, etc. As an example it may be mentioned that during tests with concentrates with a specific surface of 3100 cm.$^2$/g. and cement clinkers with a specific surface of 7300 cm.$^2$/g. a compressive strength of 15 kg. was reached with an addition of 0.2 percent, by weight, CaCl$_2$ after 12 hours.

An additional factor which often is important when reducing pellets of ore concentrates is their swelling in the course of the reduction. The swelling should be as insignificant as possible and amount to 20–30 percent, by volume, in respect of the best pellets hitherto produced. During tests with the above mentioned concentrates (3100 cm.$^2$/g.) and cement clinkers (7300 cm.$^2$/g.) a swelling of only 12–15 percent, by volume, was observed. In practice, this means a more even operation in the reduction furnaces with less risk for operational disturbances as compared to earlier experience.

The reducibility is also important for a sound economy in connection with reduction. Low reducibility means an increased consumption of carbon or a high iron content in the slag. The test considered the most reliable in this respect is the so-called Linder test according to which samples are subjected to a reduction treatment under carefully defined conditions. As a value of reducibility the degree of oxidation after the reduction treatment is indicated. According to the Linder test the best pellets hitherto known have had a degree of oxidation of 40–50 percent.

For the Linder test pellets of the above mentioned concentrates a degree of oxidation as low as 28 percent has were used; the result obtained showed a degree of oxidation between 35 and 45 percent. When using other concentrates a degree of oxidation as low as 28 percent has been obtained.

What we claim is:

1. In a process for the cold-hardening of pellets comprising finely divided metal oxide material and finely divided hydraulic binding agent in which the metal oxide material is intimately mixed with the binding agent and water and "green" pellets are produced of the obtained mixture, the improvement according to which the pellets are then embedded in a mass of discrete particles of the finely divided metal oxide material already present in the pellets in such a way that, in principle, the pellets are isolated from each other and they under the influence of the mass are subjected to a more or less uniform pressure from all sides which does not deform the pellets and that the finely divided metal oxide material is separated from the resulting hardened pellets when the pellets, thanks to the setting effect of the hydraulic binding agent have achieved an acceptable strength.

2. A process according to claim 1 in which 75–95 parts, by weight, metal oxide material are intimately mixed with 5–25 parts, by weight, hydraulic binding agent, dry weight.

3. A process according to claim 1 in which the hydraulic binding agent comprises rapidly setting cement.

4. A process according to claim 1 in which the hydraulic binding agent comprises cement clinkers which have been finely ground prior to the mixing with the metal oxide material without addition of sulphurous substances such as gypsum.

5. A process according to claim 1 in which the composition of the "green" pellets include a low content, of the order of 0.2 percent, by weight, of setting time-controlling substance, e.g. calcium chloride.

6. A process according to claim 1 in which the mass in which the green pellets are embedded comprises a component already present in the shaped bodies.

7. A process according to claim 1, in which the mass comprises finely divided particles of the metal oxide material incorporated in the pellets.

8. A process according to claim 1 in which the shaped bodies are embedded in the mass by a practically simultaneous charging into a storage vessel of pellets and mass in suitable proportions.

9. A process according to claim 8, in which the embedding mass is at least 40 percent, by weight, of the charge in the storage vessel.

10. A process according to claim 1, in which the shaped bodies comprise balls containing iron ore concentrates containing 7–10 percent water, and finely divided high early strength portland cement clinkers without deliberately added sulphur compounds.

11. A process according to claim 1, in which the temperature at which the pellets are hardened is maintained within the range 20–60° C.

12. A process according to claim 8, in which the pellets are covered by said mass whilst being charged into said storage vessel.

13. A process for the cold-hardening of shaped bodies comprising finely divided metal oxide material and finely divided hydraulic binding agent which comprises intimately mixing material, the metal oxide forming with the binding agent and water and into "green" shaped bodies, the hydraulic binding agent consisting of cement clinkers which have been subjected to a fine grinding prior to the mixing with the metal oxide material to such an extent that the ground product has acquired a specific surface exceeding 5000 cm.$^2$/g., the shaped bodies being embedded in a mass in such a way that, in principle, they are isolated from each other and the shaped bodies under the influence of the mass are subjected to an overall pressure which causes the shaped bodies to maintain their shape, and the mass is separated when the shaped bodies, thanks to the setting effect of the cement clinkers, have achieved an acceptable strength.

14. A process according to claim 13, in which the fine grinding of the cement clinker is carried on so far that the ground product has acquired a specific surface exceeding 6000 cm.$^2$/g.

References Cited

UNITED STATES PATENTS

| 1,673,891 | 6/1928 | Stehl | 75—3 |
| 2,543,895 | 3/1951 | De Vaney | 75—3 |
| 2,969,281 | 1/1961 | Monson | 75—3 |

OSCAR R. VERTIZ, Primary Examiner

G. O. PETERS, Assistant Examiner

U.S. Cl. X.R.

23—313

(5/69)

CERTIFICATE OF CORRECTION

Patent No. 3,490,895　　　　　　　Dated January 20, 1970

Inventor(s) KARL J. V. SVENSSON

It is certified that error appears in the above-identified patent and that said Letters Patent are hereby corrected as shown below:

The error which is made by the Patent Office consists in mis-stating the 4th and 5th lines of the printed claim 13, which lines should have read as follows:

-- mately mixing the metal oxide material with the binding agent and water and forming the obtained mixture into green shaped bodies, --

SIGNED AND
SEALED
JUN 23 1970

(SEAL)
Attest:

Edward M. Fletcher, Jr.
Attesting Officer

WILLIAM E. SCHUYLER, JR.
Commissioner of Patents